Dec. 2, 1958
E. B. HOTELLING ET AL
2,862,909
Di-(3 Me, 4-OH PHENYL)METHYL METHANE
ANTIOXIDANT FOR ETHYLENE POLYMERS
Filed March 12, 1957
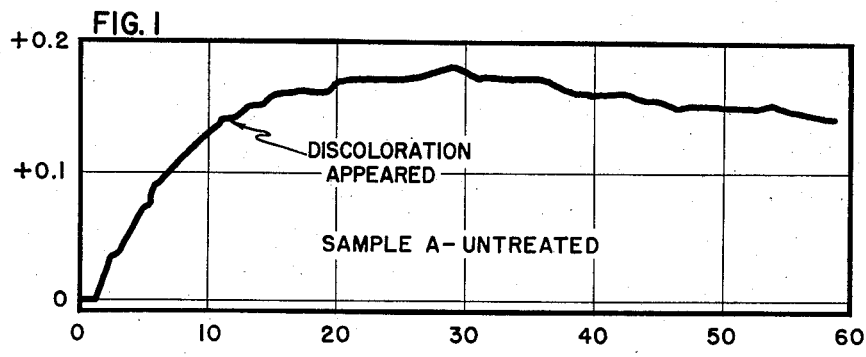
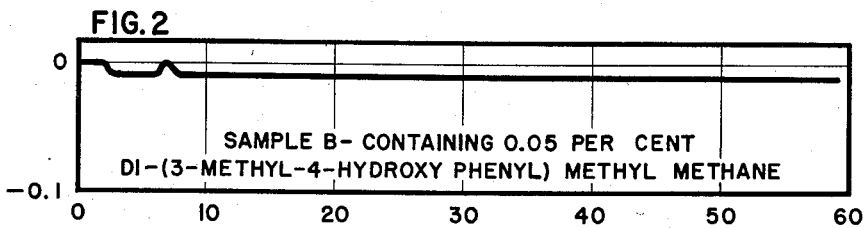
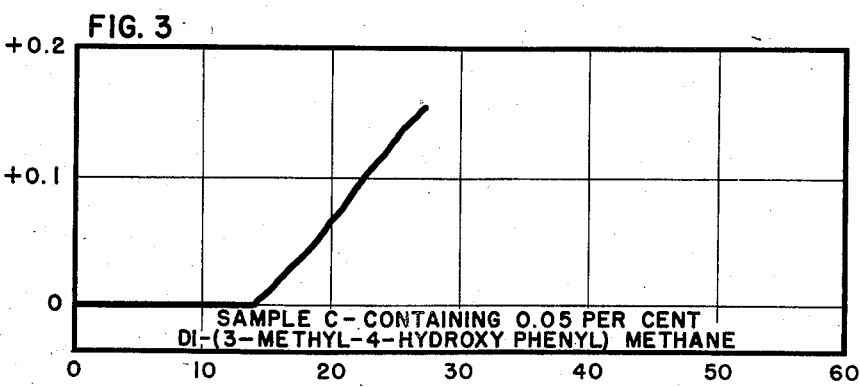
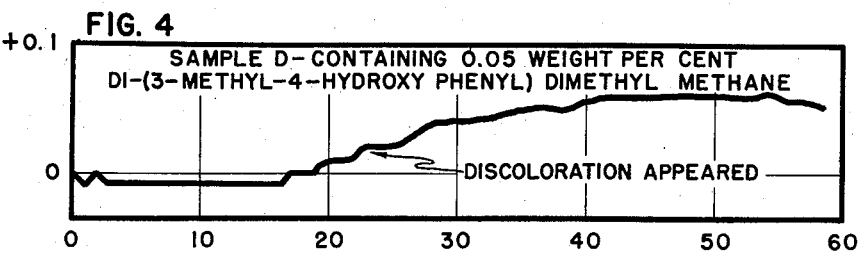
TEST PERIOD (HOURS)
INVENTOR.
ERIC B. HOTELLING
MARTIN B. NEUWORTH
BY
*Harry B. Keck*
ATTORNEY

United States Patent Office 2,862,909
Patented Dec. 2, 1958

2,862,909

DI-(3 ME, 4-OH PHENYL)METHYL METHANE ANTIOXIDANT FOR ETHYLENE POLYMERS

Eric B. Hotelling and Martin B. Neuworth, Pittsburgh, Pa., assignors to Consolidation Coal Company, Pittsburgh, Pa., a corporation of Pennsylvania Application March 12, 1957, Serial No. 645,613

2 Claims. (Cl. 260—45.95)

The present invention relates to antioxidants. More particularly, it relates to an antioxidant protection of olefinic polymers with di-(3-methyl-4-hydroxyphenyl) alkyl methanes. Still more particularly, it relates to the use of di-(3-methyl-4-hydroxylphenyl) alkyl methane as an oxidation inhibitor in polyethylene.

The recent development of the art of preparing olefinic polymers, such as polyethylene polymers, has been seriously hampered by the tendency of these materials to oxidize. The oxidation occurs under normal conditions of use and is accelerated when the materials are exposed to elevated temperatures or sunlight. The oxidation is accompanied by deterioration of the mechanical properties of the material, such as increased brittleness, a color deterioration and a change in molecular weight distribution.

We have found that the oxidation of olefinic polymers, especially polyethylene polymers, can be suppressed by the addition of a small quantity of a di-(3-methyl-4-hydroxyphenyl) alkyl methanes, as for example di-(3-methyl-4-hydroxyphenyl) methyl methane. This result was unexpected since we have also found that di-(3-methyl-4-hydroxyphenyl) dialkyl methanes and di-(3-methyl-4-hydroxyphenyl) methanes are ineffective as antioxidants in polyethylene polymers.

In order to protect olefinic polymers we prefer to add the antioxidant of this invention to the liquid polymer in a homogeneous admixture prior to milling of the polymer. We have found that quantities from 0.01 to 0.10 part of di-(3-methyl-4-hydroxyphenyl) alkyl methane for each 100 parts by weight of olefinic polymer provides adequate antioxidant protection. The resulting solidified composition comprises olefinic polymer having the antioxidant uniformly dispersed throughout.

Di-(3-methyl-4-hydroxyphenyl) alkyl methanes, especially di-(3-methyl-4-hydroxyphenyl) methyl methane are compounds known in the art. Our preferred method of preparing a di-(3-methyl-4-hydroxyphenyl alkyl methane comprises reacting two mols of orthocresol with one mol of an aliphatic aldehyde containing at least two carbon atoms in the presence of concentrated hydrochloric acid and mercaptoacetic acid as catalysts. The mixture is stirred at 30 to 50° C. for approximately 8 hours until the reaction is completed. The crude product is an excellent antioxidant material; therefore, no purification process need be employed. Where di-(3-methyl-4-hydroxyphenyl) methyl methane is desired, the starting aldehyde is acetaldehyde.

Reference should be had to the following detailed description and accompanying drawings for a clear understanding of the present invention, its objects and advantages.

Figures 1 through 4 are graphical illustrations of the weight change (in gross) of samples of polyethylene over a test period of 59 hours;

Figure 1 is a graph of weight change for polyethylene which was untreated;

Figure 2 is a graph of weight change for polyethylene treated with di-(3-methyl-4-hydroxyphenyl) methyl methane;

Figure 3 is a graph of weight change for polyethylene treated with di - (3 - methyl - 4 - hydroxyphenyl) methane; and Figure 4 is a graph of weight change for polyethylene treated with di-(3-methyl-4-hydroxyphenyl) dimethyl methane.

The following examples illustrate the utility of our present invention but are not to be construed as limiting.

Examples

To illustrate the present invention, its utility and its critical nature, we have prepared four batches of polyethylene resin (Bakelite DE-2400). The first batch, identified as sample A, contained no antioxidant material. The next batch, identified as sample B, contained an antioxidant quantity of di-(3-methyl-4-hydroxyphenyl) methyl methane in an amount equal to 0.05 percent of the polyethylene resin. The next batch, identified as sample C, contained an antioxidant quantity of di-(3-methyl-4-hydroxyphenyl) methane in an amount equal to 0.05 percent of the polyethylene resin. The last batch, identified as sample D, contained an antioxidant quantity of di-(3-methyl-4-hydroxyphenyl) dimethyl methane.

Each batch was placed on mill rolls and milled into sheets at 121° C. Portions of each milled sheet were cut into small granules and 18.00 grams of each material was uniformly spread on 6-inch diameter aluminum dishes, which were placed in a circulating air oven maintained at 150° C. Periodically the test samples were removed from the oven, cooled, weighed and returned to the oven. The weighing was continued for a period of 59 hours.

In Figures 1 through 4 we have plotted the weight change recorded for each of the samples over the test period. Figure 1 illustrates the weight increase exhibited by sample A. Oxygen absorption was evident on the first weighing and continued to increase for about 30 hours. Subsequent decrease of sample weight indicates extensive deterioration. The resin sample A was severely discolored. The discoloration in the form of an orange mottle appearance on the surface is a characteristic of polyethylene degradation.

Figure 2 illustrates the weight change exhibited by sample B which contained an antioxidant in accordance with the present invention. No significant weight change occurred throughout the entire test period. No discoloration, indicative of polyethylene degradation, appeared during the 59-hour test period.

Figure 3 illustrates the weight change exhibited by sample C which contained di-(3-methyl-4-hydroxyphenyl) methane. No weight change occurred for 14 hours. Thereafter severe weight increases occurred accompanied by a color deterioration.

Figure 4 illustrates the weight change exhibited by sample D which contained di - (3 - methyl - 4 - hydroxyphenyl) dimethyl methane. Weight increase occurred after about 19 hours indicating oxygen absorption. The discoloration of the sample which is characteristic of polyethylene deterioration appeared after about 24 hours.

Thus comparing Figures 1 and 2, the utility of our present invention is apparent. Addition of a small quantity of di - (3 - methyl - 4 - hydroxyphenyl) alkyl methane serves to protect olefinic polymers from oxidative degradation. The critical nature of our invention is apparent from comparison of Figures 2, 3 and 4. The added ingredient in each corresponding sample differs solely in the configuration of the linking carbon structure. Each ingredient is a bis-ortho-cresol methane. Where two hydrogen atoms are attached to the linking carbon atom, the material is not suitable as an antioxidant for olefinic polymers (Figure 3). Where two alkyl groups are attached to the linking carbon atom, the material is not suitable as an antioxidant for olefinic polymers (Figure 4). Where, however, one alkyl group and one hydrogen atom are attached to the linking carbon atom, as specified in the foregoing specification, the material is useful as an antioxidant for olefinic polymers (Figure 2).

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically described and illustrated.

We claim:
1. A composition comprising solidified polyethylene polymer having uniformly dispersed throughout an antioxidant quantity of di-(3-methyl-4-hydroxyphenyl) methyl methane.
2. A composition comprising polyethylene polymer containing in homogeneous admixture 0.01 to 0.10 weight percent of di - (3 - methyl - 4 - hydroxyphenyl) methyl methane.

References Cited in the file of this patent
UNITED STATES PATENTS
2,731,442    Forman _____ Jan. 17, 1956

OTHER REFERENCES
Raff et al.: "Polyethylene," pages 103–106, Interscience (1956).